(12) United States Patent
Hecht (10) Patent No.: US 11,110,521 B2
(45) Date of Patent: Sep. 7, 2021

(54) ROTARY CUTTING HEAD HAVING A RIGID MOUNTING PROTUBERANCE AND ROTARY CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/261,621

(22) Filed: Jan. 30, 2019

(65) Prior Publication Data

US 2019/0275594 A1    Sep. 12, 2019

Related U.S. Application Data

(60) Provisional application No. 62/639,671, filed on Mar. 7, 2018.

(51) Int. Cl.
*B23B 51/02* (2006.01)
*B23B 51/00* (2006.01)

(52) U.S. Cl.
CPC .............. *B23B 51/02* (2013.01); *B23B 51/00* (2013.01); *B23B 2251/02* (2013.01); *B23B 2251/202* (2013.01)

(58) Field of Classification Search
CPC ..... B23B 51/02; B23B 51/00; B23B 2251/02; B23B 2251/202; B23B 2251/40;
(Continued)

(56) References Cited

U.S. PATENT DOCUMENTS 5,957,631 A    9/1999  Hecht
6,109,841 A    8/2000  Johne
(Continued)

FOREIGN PATENT DOCUMENTS

JP    2016221664 A  * 12/2016

OTHER PUBLICATIONS

Machine Translation, JP2016221664A, Kita et al., Dec. 28, 2016. (Year: 2016).*

(Continued)

*Primary Examiner* — Eric A. Gates
*Assistant Examiner* — Chwen-Wei Su
(74) *Attorney, Agent, or Firm* — Womble Bond Dickinson (US) LLP (57) ABSTRACT

A cutting head rotatable about a first axis, has a cap portion and a rigid mounting protuberance joined thereto. The cap portion has a plurality of cutting portions circumferentially alternating with a plurality of head chip flutes, and a head base surface facing in an axial rearward direction. The mounting protuberance exhibits rotational symmetry about the first axis, extends axially rearwardly from the head base surface, and has a plurality of circumferentially spaced apart convex clamping surfaces. The plurality of cutting portions define a cutting diameter, the plurality of head chip flutes are inscribed by an imaginary first circle having a first diameter, and the plurality of clamping surfaces are circumscribed by an imaginary second circle having a second diameter. The first diameter is greater than the second diameter, and the second diameter is less than forty percent of the cutting diameter.

28 Claims, 11 Drawing Sheets

(58) Field of Classification Search
CPC ............ B23B 2251/50; B23B 2205/02; B23B 31/117; Y01T 408/9097; Y01T 408/905; Y01T 408/9093; Y01T 408/907; Y01T 408/90987

See application file for complete search history.

(56) References Cited

U.S. PATENT DOCUMENTS

| | | | |
|---|---|---|---|
| 6,276,879 B1 | 8/2001 | Hecht | |
| 6,582,164 B1 | 6/2003 | McCormick | |
| 7,189,039 B2 | 3/2007 | Pantzar | |
| 7,309,196 B2 | 12/2007 | Ruy Frota de Souza | |
| 7,360,974 B2 | 4/2008 | Borschert et al. | |
| 7,377,730 B2 | 5/2008 | Hecht et al. | |
| 7,467,915 B2 | 12/2008 | De Souza | |
| 7,972,094 B2 | 7/2011 | Men et al. | |
| 8,021,088 B2 | 9/2011 | Hecht | |
| 8,534,966 B2 | 9/2013 | Hecht | |
| 8,556,552 B2 | 10/2013 | Hecht | |
| 8,721,235 B2 * | 5/2014 | Kretzschmann | B23B 51/02 408/231 |
| 8,784,018 B2 * | 7/2014 | Päbel | B23B 51/02 408/230 |
| 8,882,413 B2 * | 11/2014 | Hecht | B23B 51/02 408/231 |
| 8,992,141 B2 | 3/2015 | Hecht et al. | |
| 8,992,142 B2 | 3/2015 | Hecht | |
| 9,028,180 B2 | 5/2015 | Hecht | |
| 10,071,430 B2 | 9/2018 | De Souza et al. | |
| 2008/0025806 A1 | 1/2008 | De Souza | |
| 2008/0193238 A1 | 8/2008 | Hecht | |
| 2009/0116920 A1 | 5/2009 | Bae | |
| 2010/0322723 A1 | 12/2010 | Danielsson | |
| 2012/0099938 A1 | 4/2012 | Shitrit et al. | |
| 2012/0121347 A1 | 5/2012 | Osawa et al. | |
| 2012/0155978 A1 | 6/2012 | Osawa et al. | |
| 2012/0315101 A1 | 12/2012 | Osawa et al. | |
| 2014/0017022 A1 | 1/2014 | Schwaegerl et al. | |
| 2014/0169892 A1 | 6/2014 | Hecht | |
| 2015/0266107 A1 | 9/2015 | Gonen et al. | |
| 2015/0360300 A1 | 12/2015 | Hecht | |
| 2018/0065191 A1 | 3/2018 | Hecht | |

OTHER PUBLICATIONS

International Search Report dated Apr. 26, 2019, issued in PCT counterpart application (No. PCT/IL2019/050152).

Written Opinion dated Apr. 26, 2019, issued in PCT counterpart application (No. PCT/IL2019/050152).

* cited by examiner

ROTARY CUTTING HEAD HAVING A RIGID MOUNTING PROTUBERANCE AND ROTARY CUTTING TOOL

RELATED APPLICATIONS

The present application claims priority to U.S. Provisional Patent Application No. 62/639,671, filed Mar. 7, 2018. The contents of the aforementioned application are incorporated by reference in their entirety.

FIELD OF THE INVENTION

The present invention relates to a rotary cutting tool and a cutting head releasably secured thereto having a rigid mounting protuberance, for use in metal cutting processes in general, and for drilling operations in particular.

BACKGROUND OF THE INVENTION

Within the field of cutting tools used in drilling operations, there are many examples of cutting heads releasably secured to tool shanks having head receiving pockets with 'circumferentially unconfined' pocket recesses.

U.S. Pat. No. 5,957,631 discloses a cutting tool assembly for rotary cutting operations comprising a replaceable cutting head and a tool shank, having a common longitudinal axis and mating peripheral surfaces. The cutting head has a cutting head mounting portion at a trailing end thereof and the tool shank has a cutting head receiving portion at a front face thereof. The cutting head mounting portion and the cutting head receiving portion of the tool shank each have at least two coupling portions bound by associated peripheral surfaces of the cutting head and the tool shank and mating in shape and dimensions. Each coupling portion has a base surface, a torque transmission wall and a fixation wall, the fixation wall of each cutting head coupling portion having an angular extension smaller than a corresponding angular distance between adjacent extremities of the fixation walls of two different tool shank coupling portions. The cutting tool is assembled by initially disposing the cutting head mounting portion in such a manner relative to the cutting head receiving portion as to insert the fixation walls of the cutting head coupling portions between the respective fixation walls of the tool shank coupling portions, and subsequently rotating the cutting head relative to the tool shank until the cutting head coupling portions fully overlie the corresponding tool shank coupling portions with their base surfaces and torque transmitting walls abutting each other and their fixation walls co-axially interacting in an interlocking male-female fashion, providing thereby the self-clamping of the cutting head on the tool shank.

U.S. Pat. No. 8,021,088 discloses a metal cutting tool having a cutting head releasably mounted on a front end of a tool shank, in a self-clamping manner. The tool shank's forward end is provided with a pair of shank coupling portions, each having a forwardly facing shank support surface. A pocket recess is defined between the shank's coupling portions. Within the pocket recess are a plurality of shank fixation surfaces which are parallel to a longitudinal axis of the tool shank. The cutting head has a cap portion and a fixation portion extending in rearward direction therefrom. The cap portion includes a pair of head segments, each having a rearwardly facing head base surface. The cutting head's fixation portion has a plurality of head fixation surfaces which are parallel to a longitudinal axis of the cutting head. In the assembled tool, the tool shank's forwardly facing shank support surfaces support the cutting head's rearwardly facing head base surfaces, while the plurality of head fixation surfaces abut the plurality of shank fixation surfaces.

SUMMARY OF THE INVENTION

In accordance with the present invention, there is provided a cutting head rotatable about a first axis in a first direction of rotation, and comprising:

a cap portion having a plurality of N cutting portions circumferentially alternating with a plurality of N head chip flutes, and a head base surface facing in an axial rearward direction; and a rigid mounting protuberance joined to the cap portion and extending axially rearwardly from the head base surface, the mounting protuberance exhibiting N-fold rotational symmetry about the first axis, and a plurality of N circumferentially spaced apart convex clamping surfaces, each clamping surface bisected by a radial clamping bisector plane containing the first axis, wherein:
the plurality of cutting portions define a cutting diameter corresponding to a cutting circle,
in a cross-section taken in a first plane perpendicular to the first axis and intersecting the cap portion, the plurality of N head chip flutes are inscribed by an imaginary first circle having a first diameter at a plurality of N radially innermost head flute points, and
in a cross-section taken in a second plane perpendicular to the first axis and intersecting the mounting protuberance, the plurality of N clamping surfaces are circumscribed by an imaginary second circle having a second diameter,
and wherein:
the first diameter is greater than the second diameter, and
the second diameter is less than forty percent of the cutting diameter.

Also, in accordance with the present invention, there is provided a rotary cutting tool comprising a tool shank extending along a second axis and having a head receiving pocket formed at a forward end thereof, the head receiving pocket comprising a shank support surface transverse to the second axis, and a central recess formed in the shank support surface, and a cutting head of the sort described above releasably secured to the head receiving pocket, wherein in an assembled position:
the head base surface faces the shank support surface,
the second axis is coincident with the first axis, and
the mounting protuberance is clampingly retained in the central recess.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

A first aspect of the present invention relates to a cutting head 20, 120 rotatable about a first axis A1 in a first direction of rotation R1.

It should be appreciated that throughout the description and claims, the same reference numerals have been used for features that are common to both the first and second embodiment cutting heads 20, 120.

In some embodiments of the present invention, the cutting head 20, 120 may preferably be manufactured by form pressing and sintering a cemented carbide, such as tungsten carbide, and may be coated or uncoated.

As shown in FIGS. 1 to 3 and 7 to 9, the cutting head 20, 120 comprises a cap portion 22 and a rigid mounting protuberance 24 joined to the cap portion 22.

It should be appreciated that the cutting head 20, 120 may be of unitary one-piece construction, and the mounting protuberance 24 may have the same rigidity as the cap portion 22 and be devoid of resiliently displaceable elements.

As shown in FIGS. 1 to 3 and 7 to 9, the cap portion 22 has N-fold rotational symmetry about the first axis A1, and comprises a plurality of N cutting portions 26 circumferentially alternating with a plurality of N head chip flutes 28, and a head base surface 30 facing in an axial rearward direction DR. The plurality of cutting portions 26 define a cutting diameter DC corresponding to a cutting circle CC centered about the first axis A1.

In some embodiments of the present invention, N may be exactly 3, and the cap portion 22 may have three cutting portions 26 circumferentially alternating with three head chip flutes 28.

Also, in some embodiments of the present invention, the head base surface 30 may be planar.

As shown in FIGS. 1 to 3 and 7 to 9, each cutting portion 26 may have a leading surface 32 facing axially forward, and with respect to the first direction of rotation R1, each leading surface 32 may intersect a circumferentially adjacent and rotationally forward head chip flute 28 to form a cutting edge 34.

It should be appreciated that for embodiments of the present invention having three cutting portions 26 and thus three cutting edges 34, the cutting head 20, 120 may advantageously be used in cutting operations with high feed rates.

Also, as shown in FIGS. 1 to 3 and 7 to 9, each cutting portion 26 may have a torque transmission surface 36 facing opposite the first direction of rotation R1.

In some embodiments of the present invention, with respect to the first direction of rotation R1, each torque transmission surface 36 may communicate with a circumferentially adjacent and rotationally rearward head chip flute 28.

Also, in some embodiments of the present invention, each torque transmission surface 36 may intersect the head base surface 30.

Further, in some embodiments of the present invention, each torque transmission surface 36 may be planar.

As shown in FIGS. 1 to 3 and 7 to 9, the mounting protuberance 24 extends axially rearwardly from the head base surface 30 and exhibits N-fold rotational symmetry about the first axis A1.

It should be appreciated that throughout the description and claims, N-fold rotational symmetry does not include an infinite order of rotational symmetry.

In some embodiments of the present invention, the mounting protuberance 24 may be entirely surrounded by the head base surface 30.

As shown in FIGS. 1 to 3 and 7 to 9, the mounting protuberance 24 has a plurality of N circumferentially spaced apart convex clamping surfaces 38, each clamping surface 38 bisected by a radial clamping bisector plane PB containing the first axis A1.

In some embodiments of the present invention, the mounting protuberance 24 may have a plurality of joining surfaces 40 circumferentially alternating with the plurality of clamping surfaces 38, and each joining surface 40 may intersect two circumferentially adjacent clamping surfaces 38.

Figure 4:
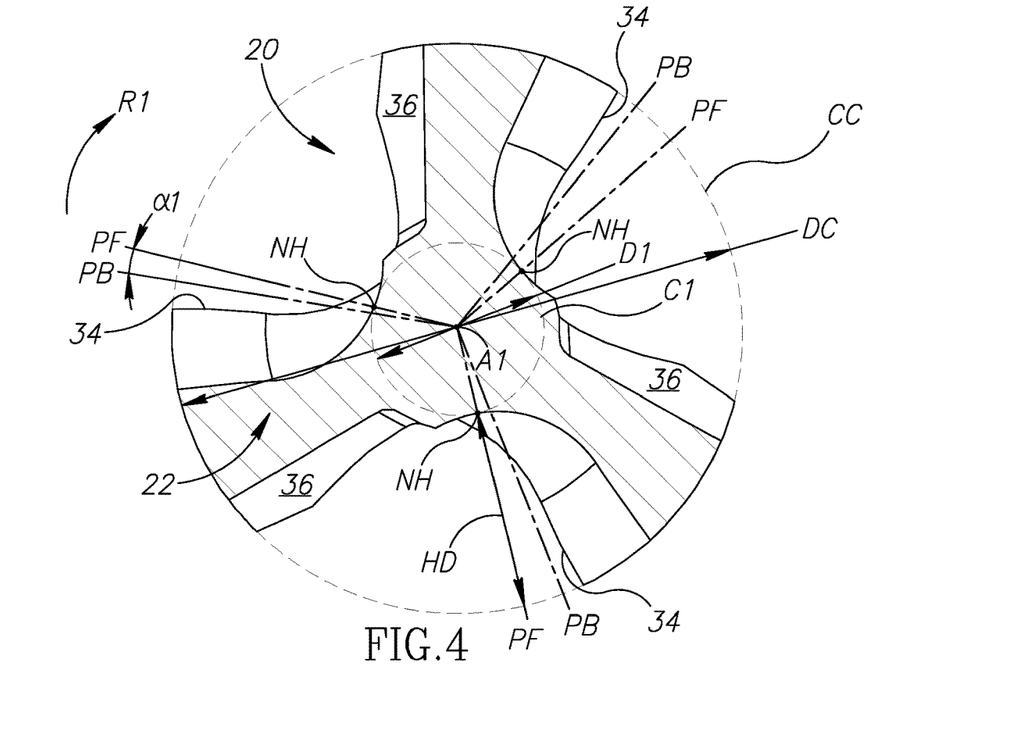
FIG. 4 is a cross-sectional view of the cutting head shown in FIG. 2, taken along the line IV-IV.
Figure 10:
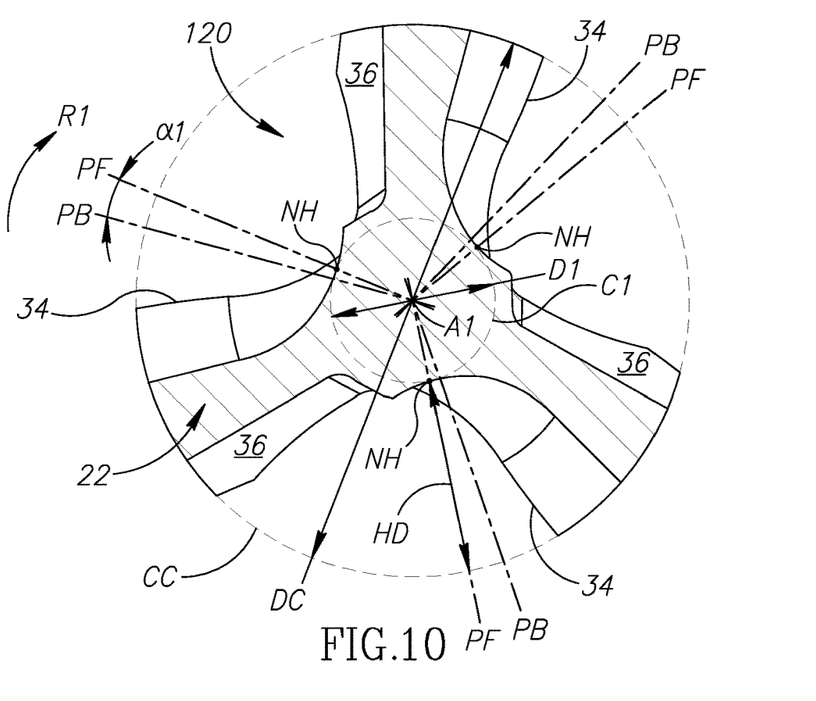
FIG. 10 is a cross-sectional view of the cutting head shown in FIG. 8, taken along the line X-X.

As shown in FIGS. 4 and 10, in a cross-section taken in a first plane P1 perpendicular to the first axis A1 and intersecting the cap portion 22, the plurality of N head chip flutes 28 are inscribed by an imaginary first circle C1 having a first diameter D1 at a plurality of N radially innermost head flute points NH.

In some embodiments of the present invention, the first plane P1 may be located adjacent the head base surface 28.

Also, in some embodiments of the present invention, each head flute point NH may be contained in a radial flute plane PF containing the first axis A1, and each radial flute plane PF may form a first angle $\alpha 1$ with a circumferentially adjacent radial clamping bisector plane PB.

Further, in some embodiments of the present invention, the first angle α1 may be less than thirty-five degrees, i.e. α1<35°.

Yet further, in some embodiments of the present invention, with respect to the first direction of rotation R1, each radial flute plane PF may be located rotationally forward of its circumferentially adjacent radial clamping bisector plane PB.

Figure 5:
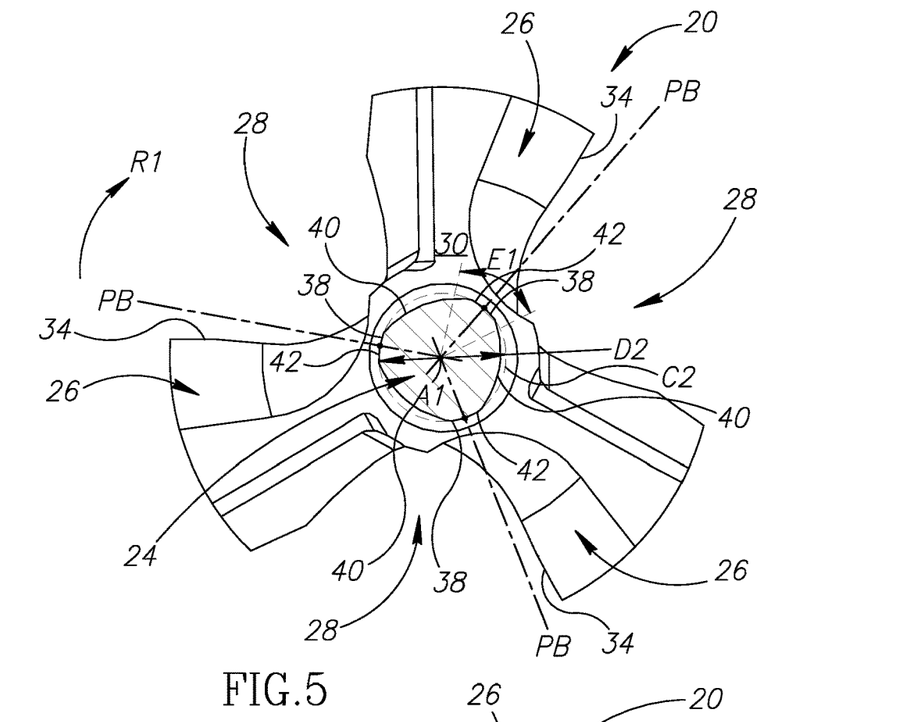
FIG. 5 is a cross-sectional view of the cutting head shown in FIG. 2, taken along the line V-V.
Figure 11:
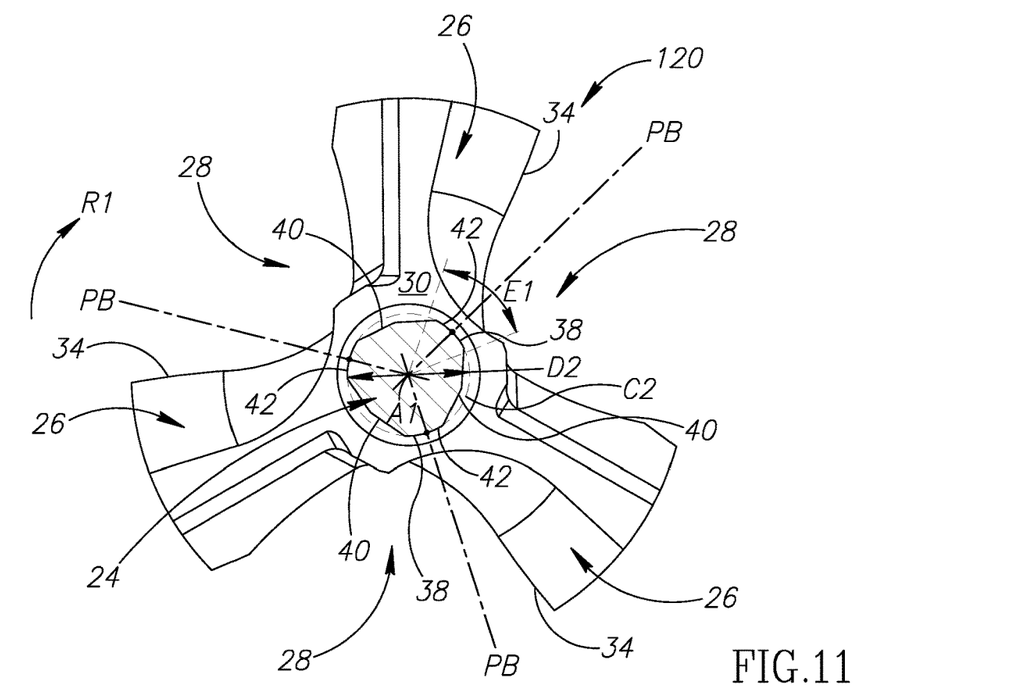
FIG. 11 is a cross-sectional view of the cutting head shown in FIG. 8, taken along the line XI-XI.

As shown in FIGS. 5 and 11, in a cross-section taken in a second plane P2 perpendicular to the first axis A1 and intersecting the mounting protuberance 24, the plurality of N clamping surfaces 38 are circumscribed by an imaginary second circle C2 having a second diameter D2.

In some embodiments of the present invention, in the cross-section taken in the second plane P2, the plurality of clamping surfaces 38 may form a plurality of spaced apart clamping arcs 42 coincident with the imaginary second circle C2.

Also, in some embodiments of the present invention, in the cross-section taken in the second plane P2, no portion of the mounting protuberance 24 may extend outside the imaginary second circle C2.

Further, in some embodiments of the present invention, in the cross-section taken in the second plane P2, each clamping surface 38 may have a first circumferential angular extent E1 greater than twenty-five degrees, i.e. E1>25°.

Yet further, in some embodiments of the present invention, in the cross-section taken in the second plane P2, the plurality of joining surfaces 40 may be located inside the second imaginary circle C2.

According to the first aspect of the present invention, the first diameter D1 is greater than the second diameter D2, and the second diameter D2 is less than forty percent of the cutting diameter DC, i.e. D2<0.40*DC.

It should be appreciated that the present invention provides a cutting head 20, 120 in which the plurality of head chip flutes 28 have an advantageously high volume to efficiently evacuate chips without intersecting the mounting protuberance 24.

In some embodiments of the present invention, the second diameter D2 may preferably be less than thirty percent of the cutting diameter DC, i.e. D2<0.30*DC.

Also, in some embodiments of the present invention, the second diameter D2 may be greater than ten percent of the cutting diameter DC, i.e. D2>0.10*DC.

Figure 6:
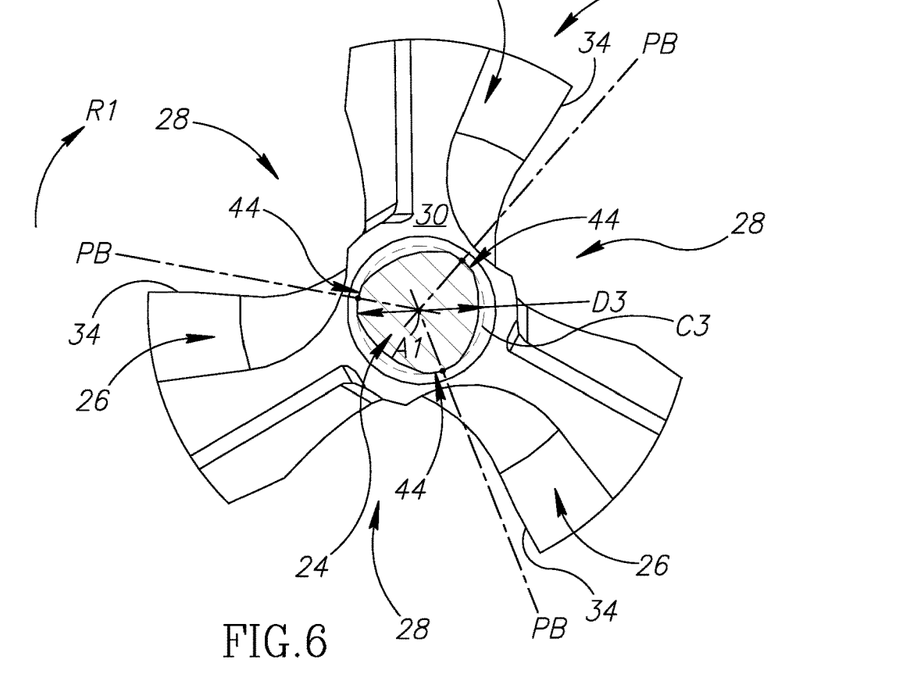
FIG. 6 is a cross-sectional view of the cutting head shown in FIG. 2, taken along the line VI-VI.
Figure 7:
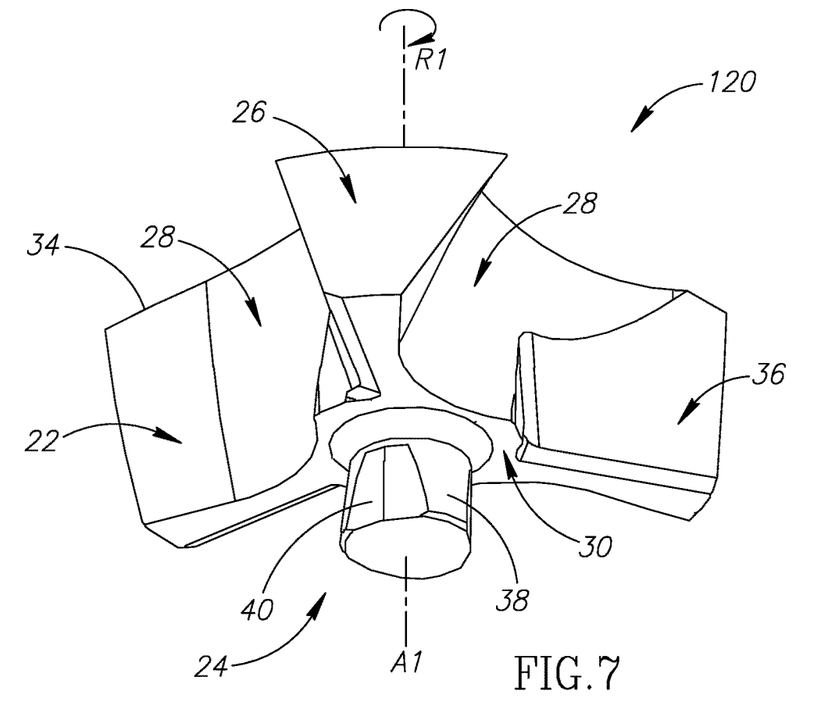
FIG. 7 is a perspective view of a cutting head in accordance with a second embodiment of the present invention.
Figure 12:
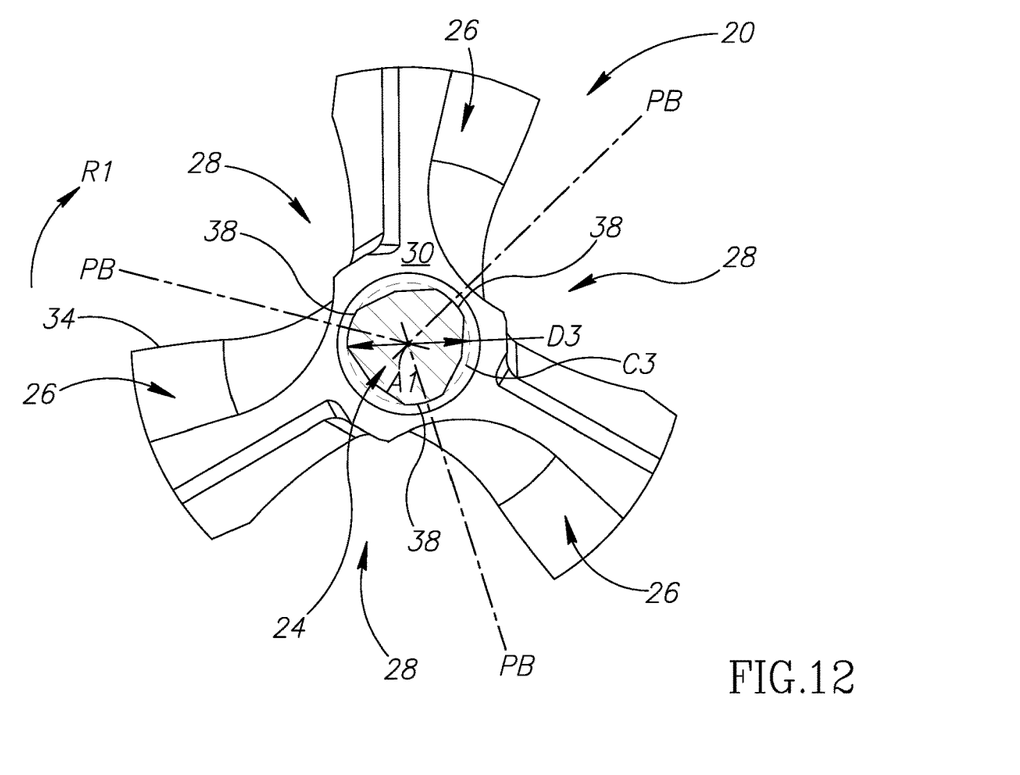
FIG. 12 is a cross-sectional view of the cutting head shown in FIG. 8, taken along the line XII-XII.
Figure 13:
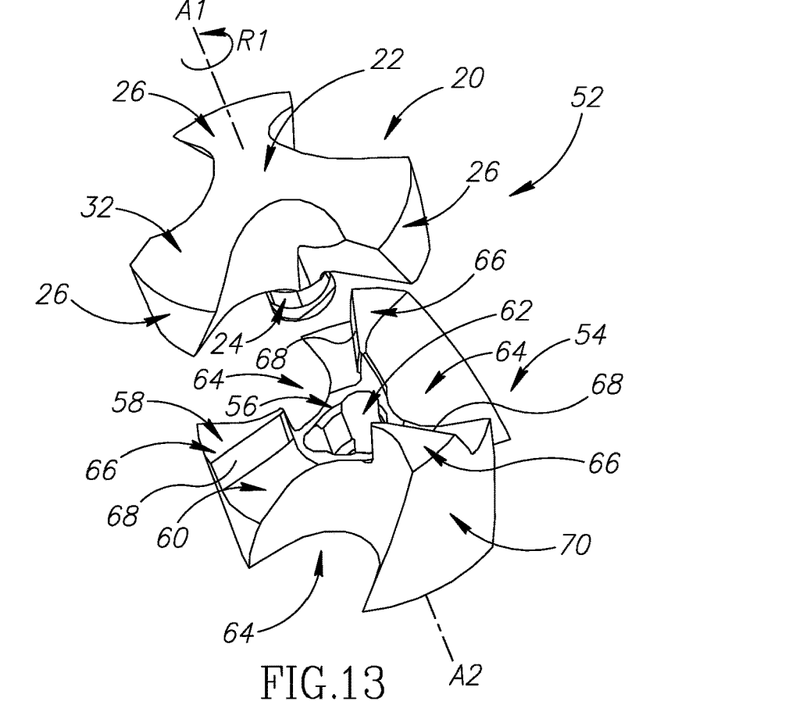
FIG. 13 is an exploded perspective view of a rotary cutting tool in accordance with a first embodiment of the present invention.
Figure 14:
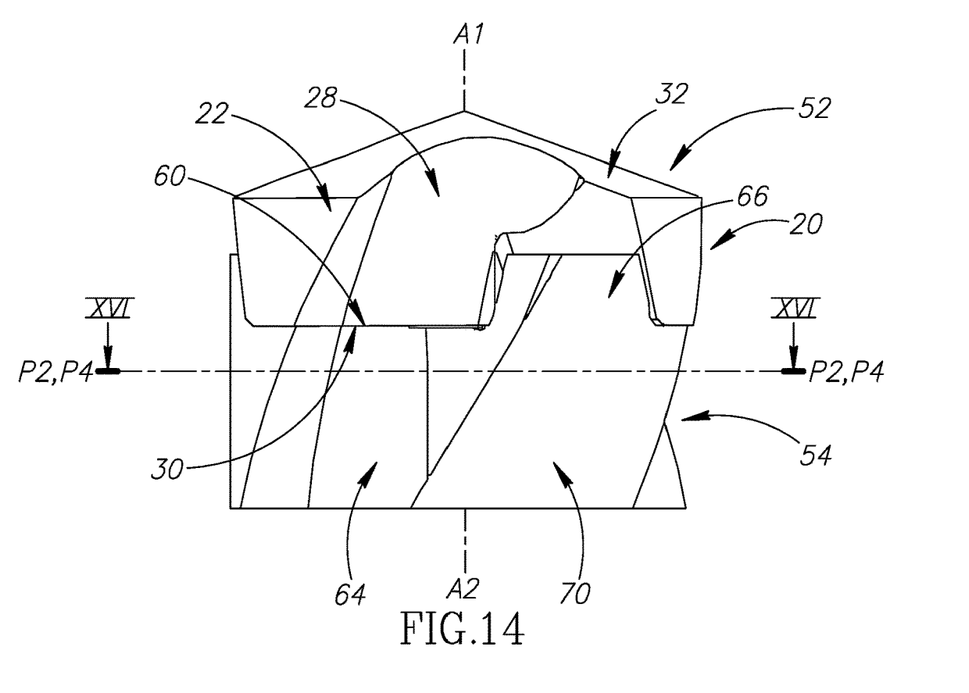
FIG. 14 is a side view of the rotary cutting tool shown in FIG. 13.

As shown in FIGS. 6 and 12, in a cross-section taken in a third plane P3 perpendicular to the first axis A1 and intersecting the mounting protuberance 24, the mounting protuberance 24 may be circumscribed by an imaginary third circle C3 having a third diameter D3 greater than the second diameter D2, i.e. D3>D2, As seen in FIGS. 4 and 10, a head flute depth HD is defined as the radial distance between the head flute points NH and the cutting circle CC. Thus, the head flute depth HD is one-half the difference between the cutting diameter DC and the first diameter D1, or HD=½(DC−D1). Since one aim of the present invention is to have a cutting head with enlarged flutes, the head flute depth HD preferably is at least 60% of one-half the cutting diameter DC, i.e., 60% of the cutting radius.

In some embodiments of the present invention, the second plane P2 may be located between the first and third planes P1, P3.

Also, in some embodiments of the present invention, the third diameter D3 may be the maximum diameter of any imaginary circle circumscribing the mounting protuberance 24 in any cross-section perpendicular to the first axis A1.

Figure 1:
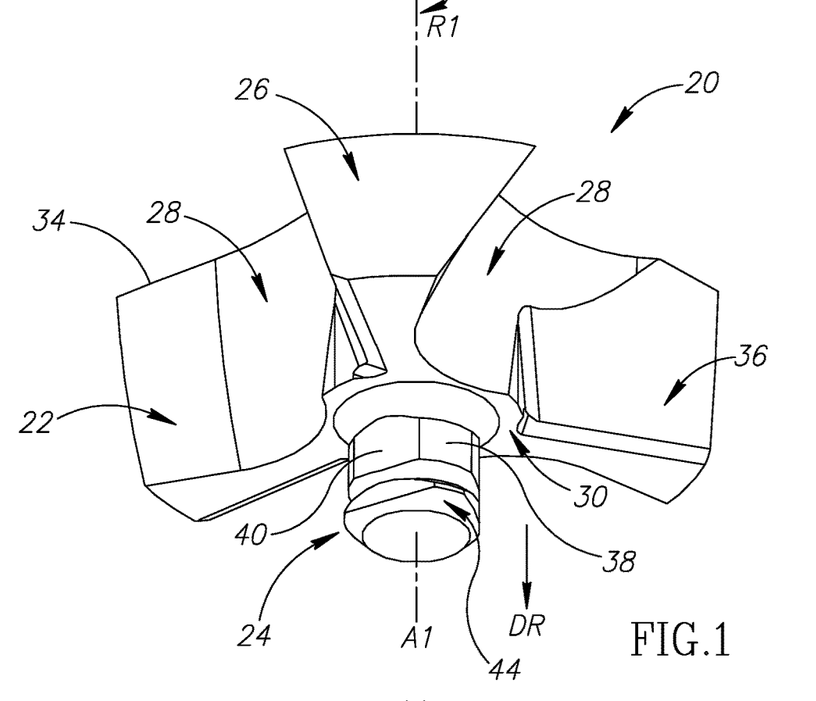
FIG. 1 is a perspective view of a cutting head in accordance with a first embodiment of the present invention.
Figure 2:
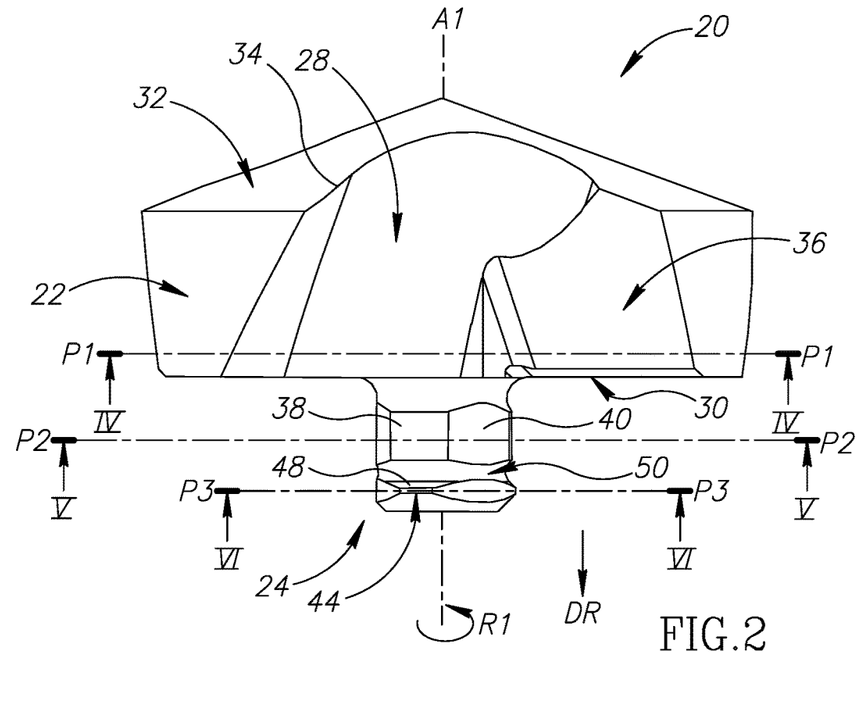
FIG. 2 is a side view of the cutting head shown in FIG. 1.
Figure 3:
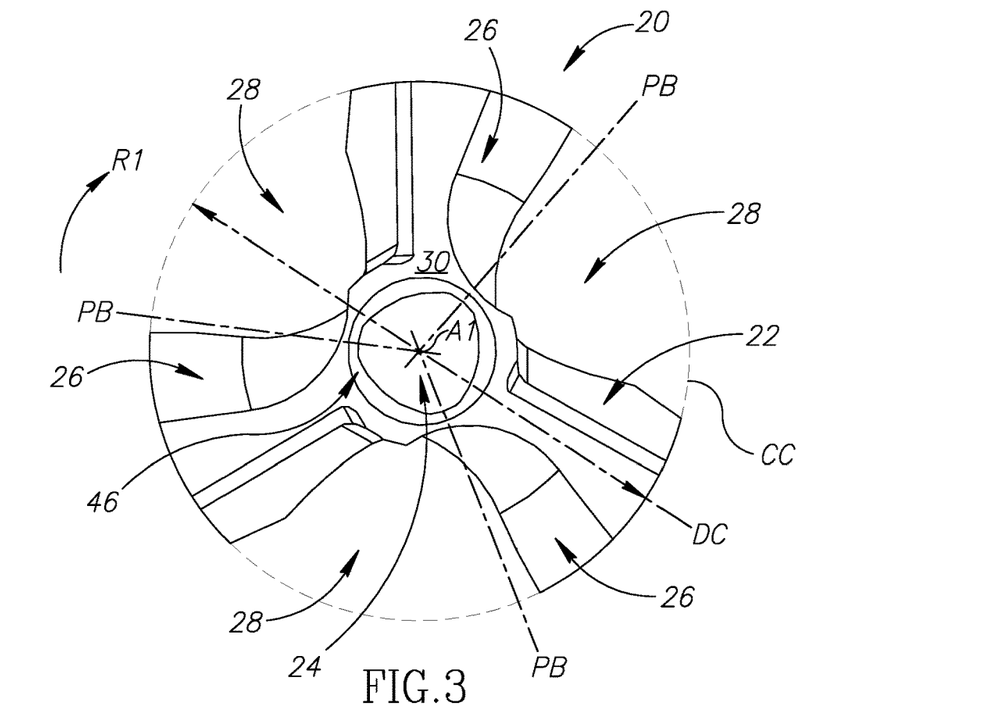
FIG. 3 is a bottom view of the cutting head shown in FIG. 1.

As shown in FIG. 2, in the first embodiment cutting head 20 of the present invention, the third plane P3 may not intersect the plurality of clamping surfaces 38, and each clamping surface 38 may be partially cylindrical shaped.

Also, in the first embodiment of the present invention, the third plane P3 may intersect a plurality of N circumferentially spaced apart axial stopper portions 44, and the imaginary third circle C3 may circumscribe the plurality of axial stopper portions 44.

It should be appreciated that for some embodiments of the present invention, the plurality of axial stopper portions 44 may form a bulge 46 at the distal end of the mounting protuberance 24.

As shown in FIG. 2, each radial clamping bisector plane PB may intersect one of the axial stopper portions 44.

In some embodiments of the present invention, each axial stopper portion 44 may have a stopper surface 48 facing axially forward.

Also, in some embodiments of the present invention, the plurality of axial stopper portions 44 may be axially spaced apart from the plurality of clamping surfaces 38 by an annular transition groove 50.

Figure 8:
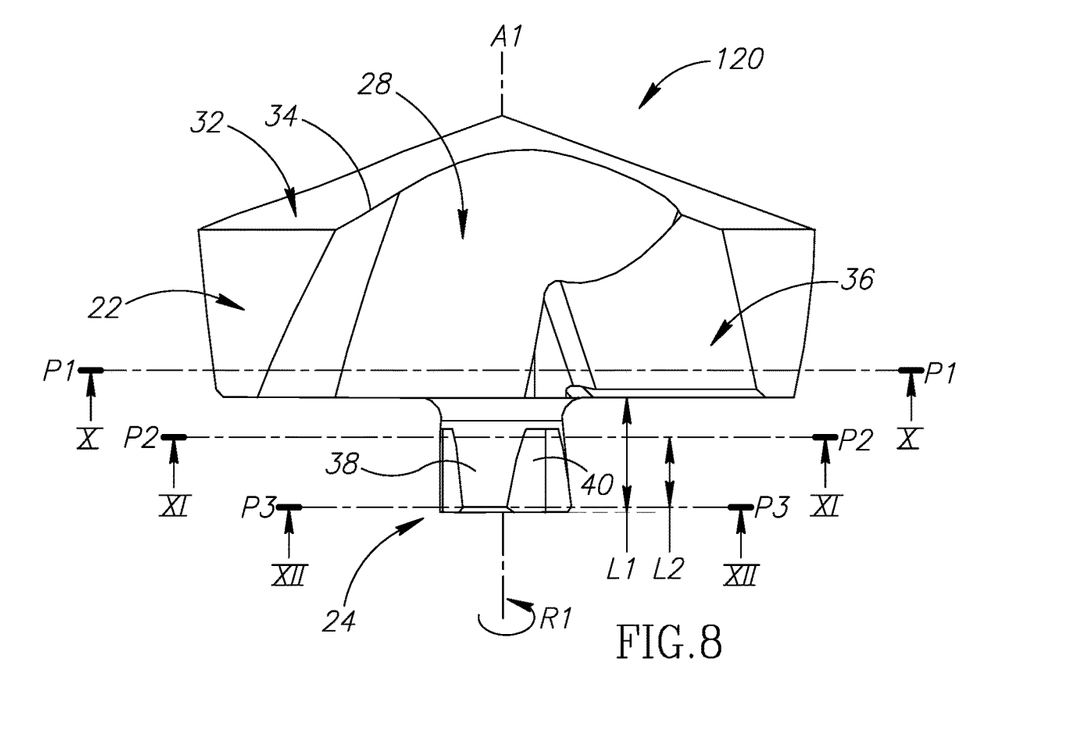
FIG. 8 is a side view of the cutting head shown in FIG. 7.
Figure 9:
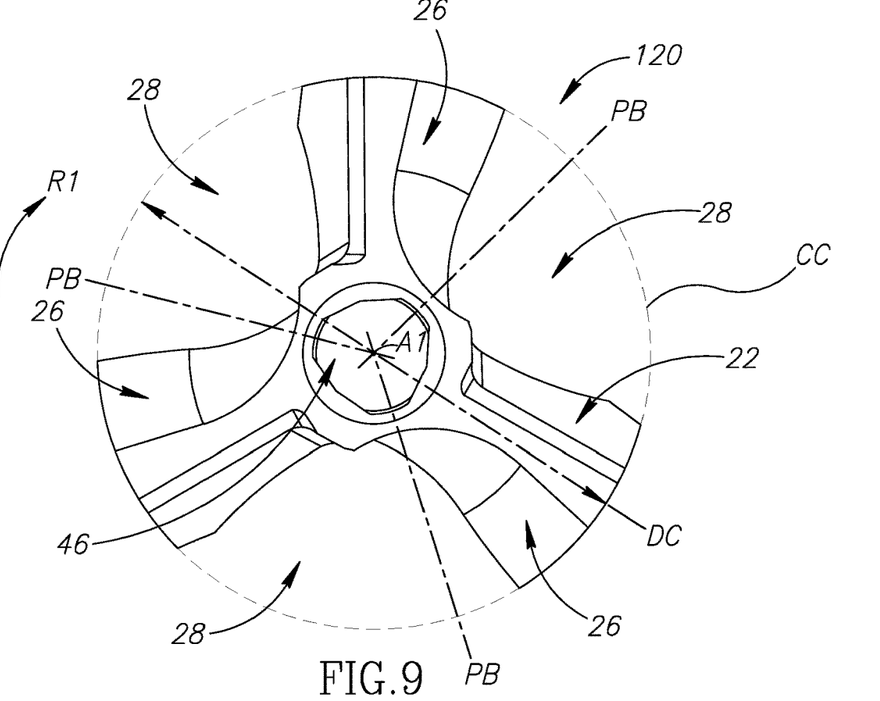
FIG. 9 is a bottom view of the cutting head shown in FIG. 7.

As shown in FIG. 8, in the second embodiment cutting head 120 of the present invention, the third plane P3 may intersect the plurality of clamping surfaces 38, and each clamping surface 38 may be partially conical shaped.

Also, in the second embodiment of the present invention, the mounting protuberance 24 may extend a first distance L1 axially rearward of the head base surface 30, the third plane P3 may be offset a second distance L2 from the second plane P2, and the second distance L2 may be greater than half the first distance L1 i.e. L2>L1/2.

It should be appreciated that for some embodiments of the present invention, the mounting protuberance 24 may be dovetail shaped.

As shown in FIGS. 13, 14, 18 and 19, a second aspect of the present invention relates to a rotary cutting tool 52, 152 having a tool shank 54, 154 extending along a second axis A2, and the cutting head 20, 120 releasably secured to a head receiving pocket 56 of the tool shank 54, 154 at forward end 58 thereof.

It should be appreciated that throughout the description and claims, the same reference numerals have been used for features that are common to both the first and second embodiment cutting tools 52, 152.

In some embodiments of the present invention, the tool shank 54, 154 may preferably be manufactured from tool steel.

Also, in some embodiments the cutting head 20, 120 may be releasably secured to the head receiving pocket 56 without the requirement of an additional fastening member, such as a clamping screw.

Figure 15:
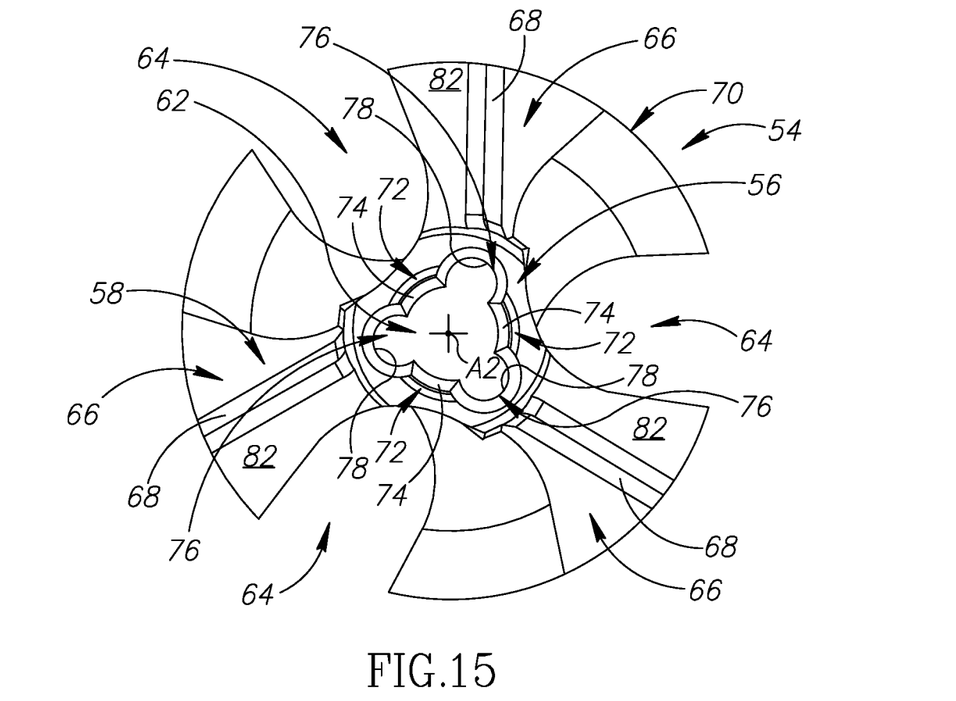
FIG. 15 is an end view of a tool shank in accordance with a first embodiment of the present invention.
Figure 20:
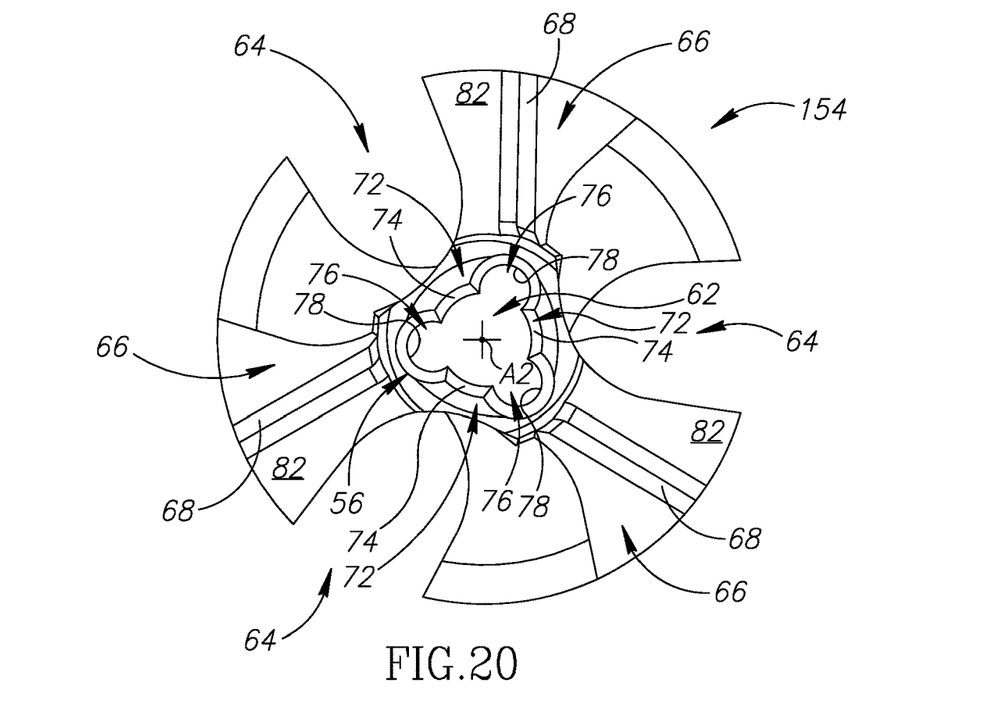
FIG. 20 is an end view of a tool shank in accordance with a second embodiment of the present invention.

As shown in FIGS. 15 and 20, the head receiving pocket 56 has a shank support surface 60 transverse to the second axis A2, and a central recess 62 formed in the shank support surface 60.

In some embodiments of the present invention, the shank support surface 60 may face axially forward, and the central recess 62 may extend along the second axis A2.

Also, in some embodiments of the present invention, a plurality of N circumferentially spaced apart shank chip flutes 64 may extend from the shank's forward end 58 along the second axis A2.

In an assembled position of the rotary cutting tool 52, 152:
the head base surface 30 faces the shank support surface 60,
the second axis A2 is coincident with the first axis A1, and the mounting protuberance 24 is clampingly retained in the central recess 62.

In some embodiments of the present invention, a plurality of N drive members 66 may protrude axially forwardly from the shank support surface 60, each drive member 66 may include a drive surface 68 facing in the first direction of rotation R1, and each drive surface 68 may make contact with one of the torque transmission surfaces 36.

Figure 16:
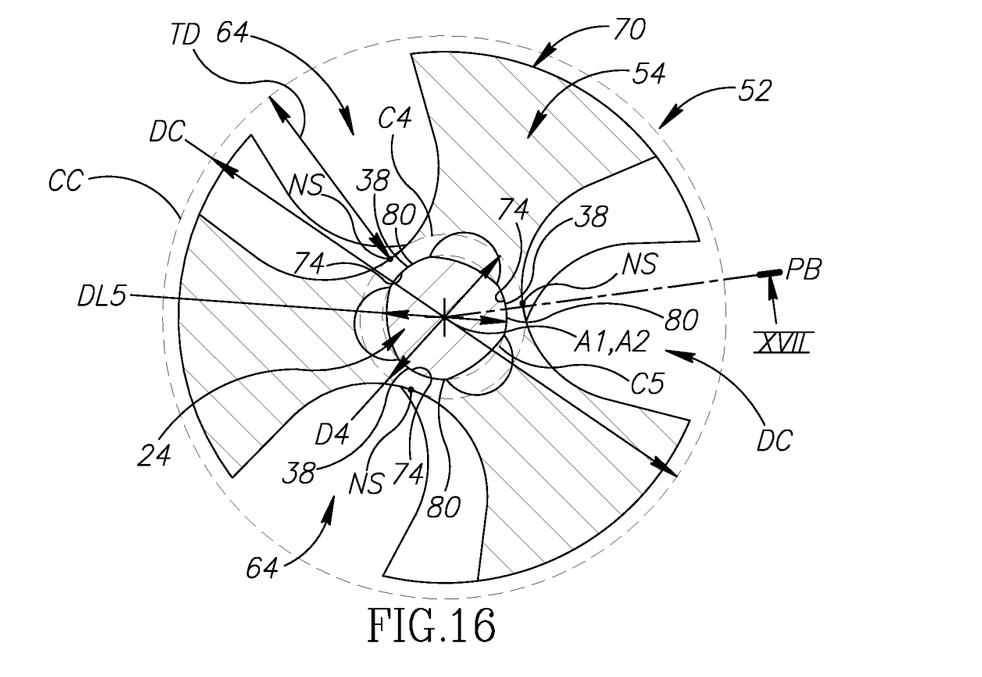
FIG. 16 is a cross-sectional view of the rotary cutting tool shown in FIG. 14, taken along the line XVI-XVI.
Figure 21:
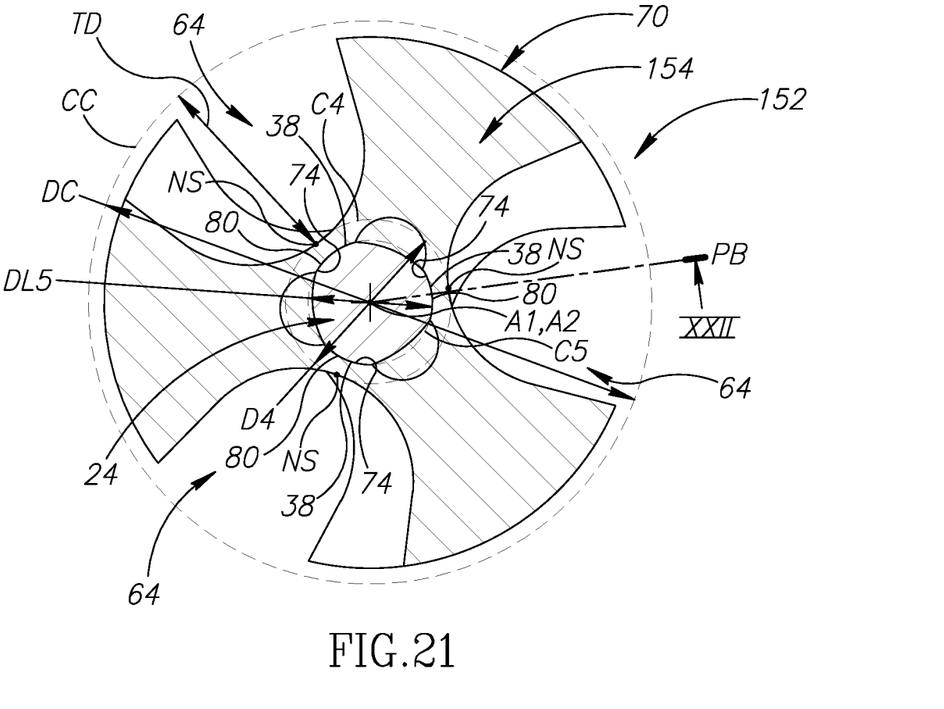
FIG. 21 is a cross-sectional view of the rotary cutting tool shown in FIG. 19, taken along the line XXI-XXI.

As shown in FIGS. 16 and 21, in a cross-section taken in a fourth plane P4 perpendicular to the first axis A1 and intersecting the central recess 62, the plurality of N shank chip flutes 64 may be inscribed by an imaginary fourth circle C4 having a fourth diameter D4 at a plurality of N radially innermost shank flute points NS.

In some embodiments of the present invention, the fourth diameter D4 may be between ninety percent and one hundred and ten percent of the first diameter D1, i.e. $D1*0.90 < D4 < D1*1.10$.

As seen in FIGS. 16 and 21, a tool flute depth TD is defined as the radial distance between the shank flute point NS and the cutting circle CC. Thus, the tool flute depth TD is one-half the difference between the cutting diameter DC and the fourth diameter D4, or $TD = \frac{1}{2}(DC-D4)$. Since one aim of the present invention is to have a tool with enlarged flutes, the tool flute depth TD preferably is at least 60% of one-half the cutting diameter DC, i.e., 60% of the cutting radius.

Also, in some embodiments of the present invention, the fourth plane P4 may be coincident with the second plane P2.

As shown in FIGS. 15 and 20, the plurality of shank chip flutes 64 may be formed in a cylindrical shank peripheral surface 70 of the tool shank 54, 154.

In some embodiments of the present invention, the plurality of shank chip flutes 70 may extend helically along the second axis A2.

Also, in some embodiments of the present invention, the plurality of head chip flutes 28 may be corresponding extensions of the plurality of shank chip flutes 70.

As shown in FIGS. 15, 16, 20 and 21, the central recess 62 may have a plurality of N circumferentially spaced apart abutment portions 72, each abutment portion 72 may have a radially inward facing abutment surface 74, and the plurality of clamping surfaces 38 may make clamping contact with the plurality of abutment surfaces 74.

In some embodiments of the present invention, the plurality of joining surfaces 40 may not be in contact with the central recess 62.

Also, in some embodiments of the present invention, the plurality of abutment portions 72 may circumferentially alternate with a plurality of intermediate portions 76, and each intermediate portion 76 may have an intermediate surface 78 intersecting two circumferentially adjacent abutment surfaces 74.

Further, in some embodiments of the present invention, the plurality of abutment portions 72 may be resiliently displaceable.

It should be appreciated that by virtue of the plurality of abutment surfaces 74 circumferentially alternating with the plurality of intermediate surfaces 78, the head receiving pocket 56 may have a 'circumferentially confined' central recess 62, which may improve the resilience of the plurality of abutment portions 72 and extend the useful life of the tool shank 54, 154.

It should also be appreciated that for embodiments of the present invention, in which the cutting head 20, 120 is releasably secured to the tool shank 54, 154 having a 'circumferentially confined' central recess 62, and the head chip flutes 28 correspond with the shank chip flutes 64, the head chip flutes 28 are required not to intersect the mounting protuberance 24.

As shown in FIGS. 16 and 21, in the cross-section taken in the second plane P2, an imaginary fifth circle C5 coaxial with the second axis A2 may inscribe the central recess 62 and contact the plurality of abutment surfaces 74.

In some embodiments of the present invention, in the cross-section taken in the second plane P2, the plurality of abutment surfaces 74 may form a plurality of spaced apart abutment arcs 80 coincident with the imaginary fifth circle C5.

Also, in some embodiments of the present invention, in the cross-section taken in the second plane P2, the plurality of intermediate surfaces 78 may be located outside the imaginary fifth circle C5.

Further, in some embodiments of the present invention, the imaginary fifth circle C5 may have a fifth loaded diameter DL5, and the fifth loaded diameter DL5 may be equal to the second diameter D2.

It should be appreciated that the fifth loaded diameter DL5 may be measured in the presence of radially outward forces being applied to the plurality of abutment surfaces 74.

It should also be appreciated that in the absence of radially outward forces being applied to the plurality of abutment surfaces 74, the imaginary fifth circle C5 may have a fifth unloaded diameter (not shown) less than the fifth loaded diameter DL5.

In some embodiments of the present invention, the head base surface 30 may contact the shank support surface 60 or a plurality of shoulder surfaces 82 offset therefrom.

It should be appreciated that in such an assembly configuration, apart from the plurality of clamping surfaces 38 making clamping contact with the plurality of abutment surfaces 74, no other portion of the mounting protuberance 24 may contact the central recess 62.

Figure 17:
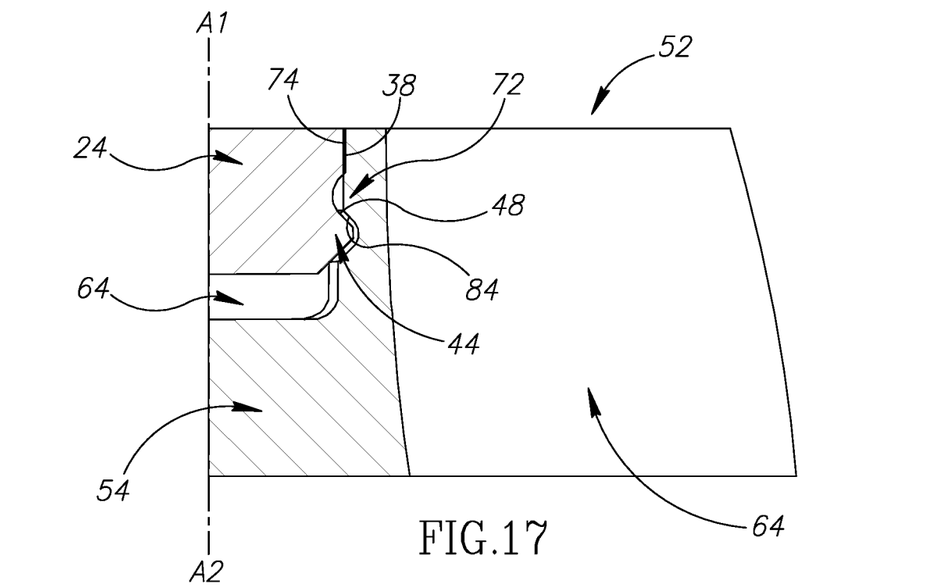
FIG. 17 is a cross-sectional view of the rotary cutting tool shown in FIG. 16, taken along the line XVII-XVII.
Figure 18:
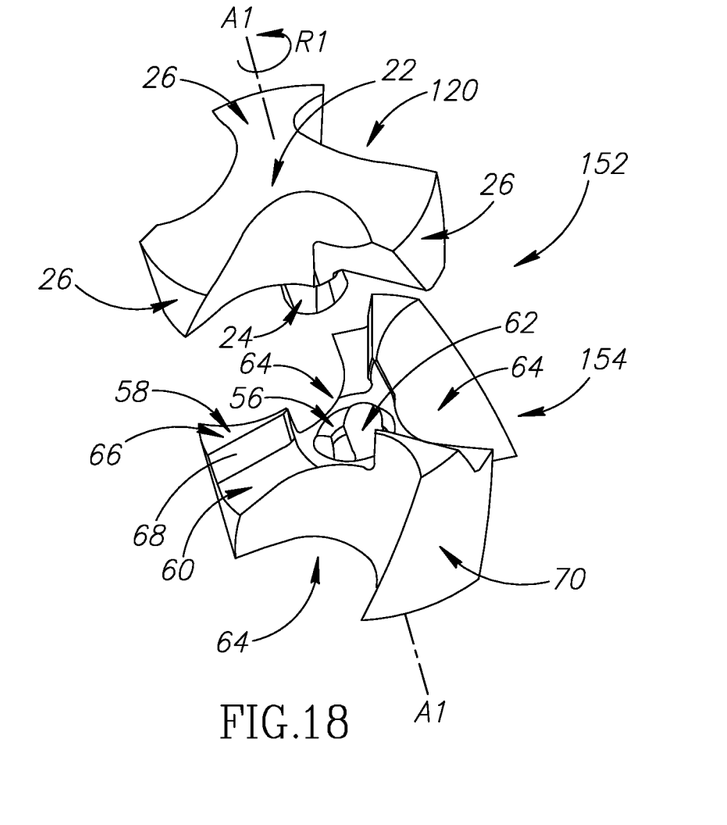
FIG. 18 is an exploded perspective view of a rotary cutting tool in accordance with a second embodiment of the present invention.
Figure 19:
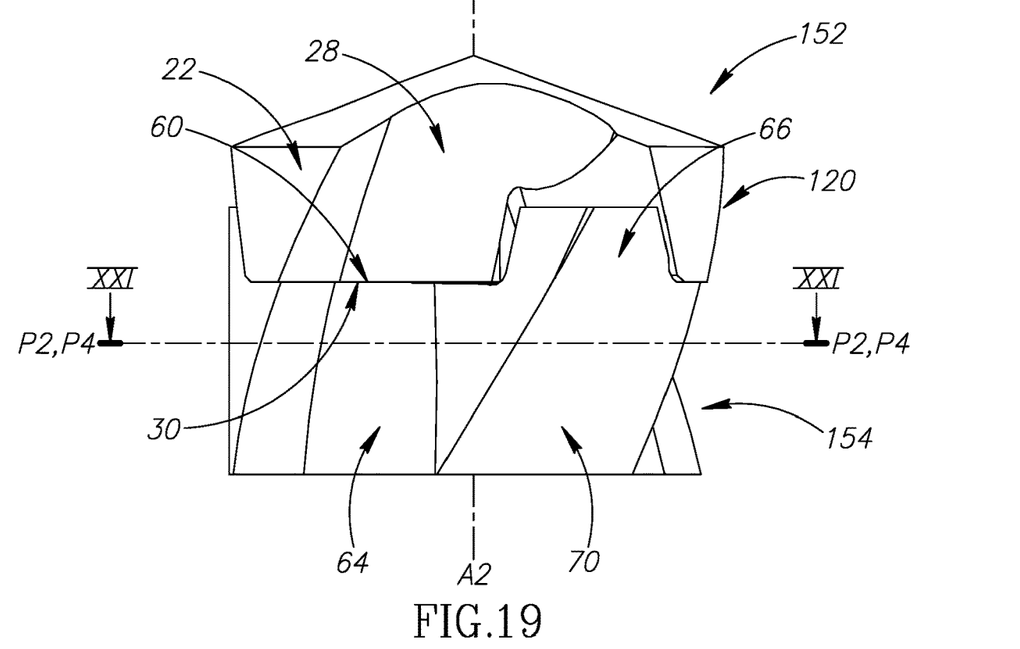
FIG. 19 is a side view of the rotary cutting tool shown in FIG. 18.

As shown in FIG. 17, in a cross-section taken in one of the radial clamping bisector planes PB in the first embodiment cutting tool 52 of the present invention, the clamping surface 38 may be partially cylindrically shaped and extend parallel to the first axis A1, and the associated abutment surface 74 may be coincident therewith.

It should be appreciated that in such embodiments of the present invention, clamping contact between the plurality of clamping surfaces 38 and the plurality of abutment surfaces 74 is solely directed radially.

As shown in FIG. 17, in the first embodiment cutting tool 52 of the present invention, each abutment portion 72 may have a stopping surface 84 facing axially rearward, and the plurality of stopper surfaces 48 may be axially spaced apart from the plurality of stopping surfaces 84.

It should be appreciated that in instances of excessive axial 'pulling' forces acting on the first embodiment cutting head 20, the head base surface 30 may not remain in contact with the shank support surface 60 and the plurality of stopper surfaces 48 may make contact with the plurality of stopping surfaces 84, thus preventing the cutting head 20 from becoming detached from the tool shank 54.

Figure 22:
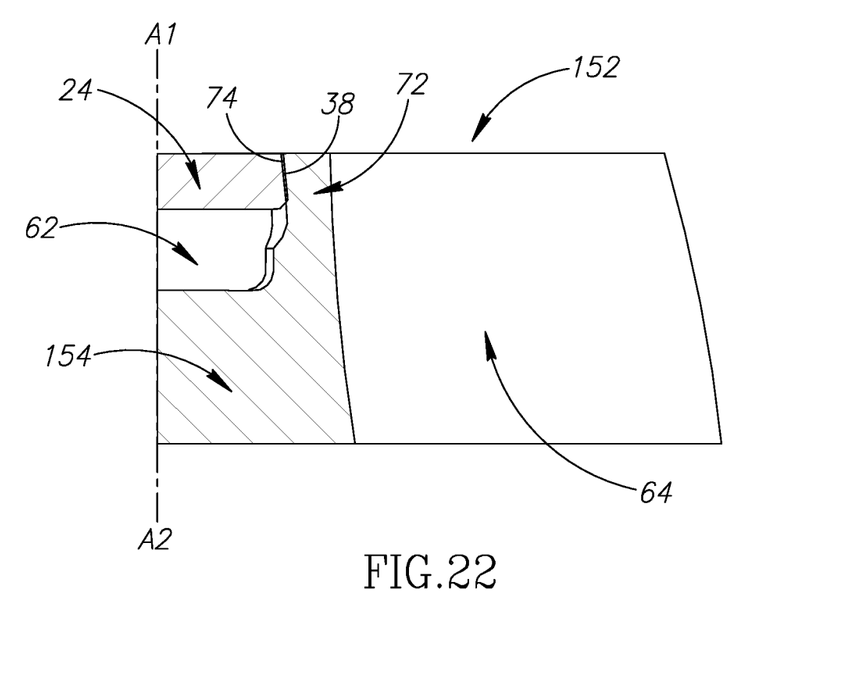
FIG. 22 is a cross-sectional view of the rotary cutting tool shown in FIG. 21, taken along the line XXII-XXII.

As shown in FIG. 22, in a cross-section taken in one of the radial clamping bisector planes PB in the second embodiment cutting tool 152 of the present invention, the clamping surface 38 may be partially conically shaped and diverge away from the first axis A1 as it extends axially rearwardly, and the associated abutment surface 74 may be coincident therewith.

It should be appreciated that in such embodiments of the present invention, clamping contact between the plurality of clamping surfaces 38 and the plurality of abutment surfaces 74 is directed both axially and radially.

The present invention further relates to a method of assembling the rotary cutting tool 52, 152, comprising the steps of:
a) orienting the head base surface 30 to face the shank support surface 60;
b) aligning the first axis A1 with the second axis A2;
c) rotationally aligning the plurality of clamping surfaces 38 with the plurality of intermediate surfaces 78;
d) inserting the mounting protuberance 24 into the central recess 62; and
e) rotating the cutting head 20, 120 about its first axis A1 until the plurality of clamping surfaces 38 are retained against the plurality of abutment surfaces 74.

In some embodiments of the present invention, in step d), the mounting protuberance 24 may be inserted into the central recess 62 until the head base surface 30 makes contact with the shank support surface 60, or the plurality of shoulder surfaces 82.

Also, in some embodiments of the present invention, in step e), the cutting head 20, 120 may be rotated about its first axis A1 in a direction opposite to the first direction of rotation R1 until each drive surface 68 makes contact with one of the torque transmission surfaces 36.

Although the present invention has been described to a certain degree of particularity, it should be understood that various alterations and modifications could be made without departing from the spirit or scope of the invention as hereinafter claimed.

What is claimed is:

1. A cutting head (20, 120) rotatable about a first axis (A1) in a first direction of rotation (R1), and comprising:
a cap portion (22) having N cutting portions (26) circumferentially alternating with N head chip flutes (28), and a head base surface (30) facing in an axial rearward direction (DR);
wherein each cutting portion (26) comprises a cutting edge (34) formed at the intersection of an axially forward facing leading surface (32) and a circumferentially adjacent and rotationally forward head chip flute (28), the cutting edge (34) extending in a direction transverse to the first axis (A1); and
a rigid mounting protuberance (24) devoid of resiliently displaceable elements joined to the cap portion (22) and extending axially rearwardly from the head base surface (30), the mounting protuberance (24) exhibiting N-fold rotational symmetry about the first axis (A1), and having N circumferentially spaced apart convex clamping surfaces (38), each clamping surface (38) bisected by a radial clamping bisector plane (PB) containing the first axis (A1),
wherein:
N is an integer number greater than 1,
the N cutting portions (26) define a cutting diameter (DC) corresponding to a cutting circle (CC),
the N clamping surfaces (38) is equal in number to the N cutting portions (26),
in a cross-section taken in a first plane (P1) perpendicular to the first axis (A1) and intersecting the cap portion (22), the N head chip flutes (28) are inscribed by an imaginary first circle (C1) having a first diameter (D1) at N radially innermost head flute points (NH), and
in a cross-section taken in a second plane (P2) perpendicular to the first axis (A1) and intersecting the mounting protuberance (24), the N clamping surfaces (38) are circumscribed by an imaginary second circle (C2) having a second diameter (D2),
and wherein:
the first diameter (D1) is greater than the second diameter (D2), and
the second diameter (D2) is less than forty percent of the cutting diameter (DC).

2. The cutting head (20, 120) according to claim 1, wherein the second diameter (D2) is less than thirty percent of the cutting diameter (DC).

3. The cutting head (20, 120) according to claim 1, wherein:
each head flute point (NH) is contained in a radial flute plane (PF) containing the first axis (A1), each radial flute plane (PF) forms a first angle (al) with a circumferentially adjacent radial clamping bisector plane (PB), and
the first angle (al) is less than thirty-five degrees.

4. The cutting head (20, 120) according to claim 1, wherein in the cross-section taken in the second plane (P2):
the N clamping surfaces (38) form N spaced apart clamping arcs (42) coincident with the imaginary second circle (C2).

5. The cutting head (20, 120) according to claim 1, wherein N=3.

6. The cutting head (20, 120) according to claim 1, wherein the mounting protuberance (24) is entirely surrounded by the head base surface (30).

7. The cutting head (20, 120) according to claim 1, wherein:
the mounting protuberance (24) has N joining surfaces (40) circumferentially alternating with the N clamping surfaces (38), and
each joining surface (40) intersects two circumferentially adjacent clamping surfaces (38).

8. The cutting head (20, 120) according to claim 1, wherein:
in a cross-section taken in a third plane (P3) perpendicular to the first axis (A1) and intersecting the mounting protuberance (24), the mounting protuberance (24) is circumscribed by an imaginary third circle (C3) having a third diameter (D3) greater than the second diameter (D2), and
the second plane (P2) is located between the first and third planes (P1, P3).

9. The cutting head (120) according to claim 8, wherein:
the third plane (P3) intersects the N clamping surfaces (38), and
each clamping surface (38) is partially conical shaped.

10. The cutting head (20) according to claim 8, wherein:
the third plane (P3) does not intersect the N clamping surfaces (38), and
each clamping surface (38) is partially cylindrical shaped.

11. The cutting head (20) according to claim 8, wherein:
the third plane (P3) intersects N circumferentially spaced apart axial stopper portions (44), and
the imaginary third circle (C3) circumscribes the N axial stopper portions (44).

12. The cutting head (20) according to claim 11, wherein:
each radial clamping bisector plane (PB) intersects one of the axial stopper portions (44).

13. The cutting head (20) according to claim 11, wherein:
each axial stopper portion (44) has a stopper surface (48) facing axially forward.

14. The cutting head (20, 120) according to claim 1, wherein:

a head flute depth (HD) is defined as the radial distance between the head flute points (NH) and the cutting circle (CC); and the head flute depth (HD) is at least 60% of one-half the cutting diameter (DC).

15. The cutting head (20, 120) according to claim 1, wherein the N head chip flutes (28) intersect the head base surface (30).

16. The cutting head (20, 120) according to claim 1, wherein:

N is exactly 3;

the cap portion (22) has exactly three cutting portions (26) and exactly three head chip flutes (28) and the mounting protuberance (24) has exactly three-fold rotational symmetry and exactly three clamping surfaces (38).

17. The cutting head (20, 120) according to claim 1, configured as a drill head for use in drilling operations.

18. A rotary cutting tool (52, 152) comprising:

a tool shank (54, 154) extending along a second axis (A2) and having a head receiving pocket (56) formed at a forward end thereof, the head receiving pocket (56) comprising a shank support surface (60) transverse to the second axis (A2) and a central recess (62) formed in the shank support surface (60), wherein:

the central recess (62) has N circumferentially spaced apart abutment portions (72), each abutment portion (72) has a radially inward facing abutment surface (74), and N is an integer greater than 1; and a cutting head (20, 120) releasably secured to the head receiving pocket (56), the cutting head being rotatable about a first axis (A1) in a first direction of rotation (R1), and comprising:

a cap portion (22) having N cutting portions (26) circumferentially alternating with N head chip flutes (28), and a head base surface (30) facing in an axial rearward direction (DR); and a rigid mounting protuberance (24) joined to the cap portion (22) and extending axially rearwardly from the head base surface (30), the mounting protuberance (24) exhibiting N-fold rotational symmetry about the first axis (A1), and having N circumferentially spaced apart convex clamping surfaces (38), each clamping surface (38) bisected by a radial clamping bisector plane (PB) containing the first axis (A1), wherein:

the N cutting portions (26) define a cutting diameter (DC) corresponding to a cutting circle (CC), the N clamping surfaces (38) is equal in number to the N cutting portions (26), in a cross-section taken in a first plane (P1) perpendicular to the first axis (A1) and intersecting the cap portion (22), the N head chip flutes (28) are inscribed by an imaginary first circle (C1) having a first diameter (D1) at N radially innermost head flute points (NH), and in a cross-section taken in a second plane (P2) perpendicular to the first axis (A1) and intersecting the mounting protuberance (24), the N clamping surfaces (38) are circumscribed by an imaginary second circle (C2) having a second diameter (D2), and wherein:

the first diameter (D1) is greater than the second diameter (D2), and the second diameter (D2) is less than forty percent of the cutting diameter (DC);

wherein in an assembled position:

the head base surface (30) contacts the shank support surface (60) or a plurality of shoulder surfaces (82) offset therefrom, the second axis (A2) is coincident with the first axis (A1), and the mounting protuberance (24) is clampingly retained in the central recess (62), with the N clamping surfaces (38) make clamping contact with the N abutment surfaces (74), and apart from the N clamping surfaces (38) making clamping contact with abutment surfaces (74), no other portion of the mounting protuberance (20) contacts the central recess (62).

19. The rotary cutting tool (52, 152) according to claim 18, wherein:

the N abutment portions (72) are resiliently displaceable.

20. The rotary cutting tool (52, 152) according to claim 18, wherein:

The N abutment portions (72) circumferentially alternate with N intermediate portions (76), and each intermediate portion (76) has an intermediate surface (78) intersecting two circumferentially adjacent abutment surfaces (74).

21. The rotary cutting tool (52) according to claim 18, wherein:

the clamping surface (38) is partially cylindrically shaped; and in a cross-section taken in one of the radial clamping bisector planes (PB):

the clamping surface (38) extends parallel to the first axis (A1), and the associated abutment surface (74) is coincident therewith.

22. The rotary cutting tool (152) according to claim 18, wherein:

the clamping surface (38) is partially conically shaped; and in a cross-section taken in one of the radial clamping bisector planes (PB):

the clamping surface (38) diverges away from the first axis (A1) as it extends axially rearwardly, and the associated abutment surface (74) is coincident therewith.

23. The rotary cutting tool (52, 152) according to claim 18, wherein:

N circumferentially spaced apart shank chip flutes (64) extend from the shank's forward end (58) along the second axis (A2), in a cross-section taken in a fourth plane (P4) perpendicular to the first axis (A1) and intersecting the central recess (62), the N shank chip flutes (64) are inscribed by an imaginary fourth circle (C4) having a fourth diameter (D4) at N radially innermost shank flute points (NS), and the fourth diameter (D4) is between ninety percent and one hundred and ten percent of the first diameter (D1).

24. The rotary cutting tool (52, 152) according to claim 23, wherein:

the N head chip flutes (26) are corresponding extensions of the N shank chip flutes (64).

25. The rotary cutting tool (52, 152) according to claim 23, wherein:

a tool flute depth (TD) is defined as the radial distance between the shank flute points (NS) and the cutting circle (CC); and the tool flute depth (TD) is at least 60% of one-half the cutting diameter (DC).

26. A cutting head (20, 120) rotatable about a first axis (A1) in a first direction of rotation (R1), and comprising:

a cap portion (22) having N cutting portions (26) circumferentially alternating with N head chip flutes (28), a head base surface (30) facing in an axial rearward direction (DR), and the N head chip flutes (28) intersecting the head base surface (30); and a rigid mounting protuberance (24) joined to the cap portion (22) and extending axially rearwardly from the head base surface (30), the mounting protuberance (24) exhibiting N-fold rotational symmetry about the first axis (A1), and having N circumferentially spaced apart convex clamping surfaces (38) and N joining surfaces (40) circumferentially alternating with the N clamping surfaces (38), each clamping surface (38) bisected by a radial clamping bisector plane (PB) containing the first axis (A1), and each joining surface (40) intersecting two circumferentially adjacent clamping surfaces (38), wherein:

N is an integer number greater than 1, the N cutting portions (26) define a cutting diameter (DC) corresponding to a cutting circle (CC), the N clamping surfaces (38) is equal in number to the N cutting portions (26), each cutting portion (26) has a single cutting edge (34) associated therewith, such that the cutting head has a total of N cutting edges, a total of N cutting portions and a total of N clamping surfaces;

in a cross-section taken in a first plane (P1) perpendicular to the first axis (A1) and intersecting the cap portion (22), the N head chip flutes (28) are inscribed by an imaginary first circle (C1) having a first diameter (D1) at N radially innermost head flute points (NH), and in a cross-section taken in a second plane (P2) perpendicular to the first axis (A1) and intersecting the mounting protuberance (24), the N clamping surfaces (38) are circumscribed by an imaginary second circle (C2) having a second diameter (D2), and wherein:

the first diameter (D1) is greater than the second diameter (D2), and the second diameter (D2) is less than forty percent of the cutting diameter (DC).

27. The cutting head (20, 120) according to claim 26, wherein the mounting protuberance (24) is devoid of resiliently displaceable elements.

28. The cutting head (20, 120) according to claim 26, wherein the cap portion (22) and the mounting protuberance (24) both exhibit N-fold rotational symmetry about the first axis (A1).

* * * * *